United States Patent
Komatsu et al.

(10) Patent No.: US 7,364,332 B2
(45) Date of Patent: *Apr. 29, 2008

(54) VEHICLE HEADLAMP

(75) Inventors: Motohiro Komatsu, Shizuoka (JP); Michihiko Hayakawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 11/067,923

(22) Filed: Mar. 1, 2005

(65) Prior Publication Data

US 2005/0225995 A1    Oct. 13, 2005

(30) Foreign Application Priority Data

Mar. 1, 2004  (JP) .......................... P.2004-056873

(51) Int. Cl.
*F21V 5/00* (2006.01)
*F21V 1/00* (2006.01)
*B60Q 1/00* (2006.01)

(52) U.S. Cl. ............... 362/522; 362/521; 362/538; 362/539; 362/509

(58) Field of Classification Search ........ 362/520–522, 362/509, 538, 539
See application file for complete search history.

(56) References Cited

U.S. PATENT DOCUMENTS

| | | | | |
|---|---|---|---|---|
| 4,677,532 A | * | 6/1987 | Peitz et al. | 362/539 |
| 4,814,950 A | * | 3/1989 | Nakata | 362/539 |
| 4,851,968 A | * | 7/1989 | Nino | 362/539 |
| 5,245,515 A | * | 9/1993 | Schwaller et al. | 362/521 |
| 6,030,107 A | * | 2/2000 | Hamm | 362/511 |
| 6,050,705 A | * | 4/2000 | Kusserow et al. | 362/299 |
| 6,059,433 A | * | 5/2000 | Otaka et al. | 362/507 |
| 6,132,074 A | * | 10/2000 | Bristle et al. | 362/538 |
| 6,193,400 B1 | * | 2/2001 | Schuster et al. | 362/538 |
| 6,220,736 B1 | * | 4/2001 | Dobler et al. | 362/539 |
| 6,454,448 B2 | * | 9/2002 | Taniuchi et al. | 362/517 |
| 6,578,997 B2 | * | 6/2003 | Futami | 362/522 |
| 6,776,513 B2 | * | 8/2004 | Albou | 362/507 |
| 6,910,791 B2 | * | 6/2005 | Futami | 362/517 |

(Continued)

FOREIGN PATENT DOCUMENTS

JP    2-47704 U    4/1990

(Continued)

*Primary Examiner*—Jong-Suk (James) Lee
*Assistant Examiner*—David J Makiya
(74) *Attorney, Agent, or Firm*—Sughrue Mion, PLLC

(57) ABSTRACT

A light source bulb 22 is inserted and fixed into a reflector 24 from a side in a position placed downward apart from an optical axis Ax. Thus, it is possible to effectively utilize an optical-axis side region in a reflecting plane 24a for a light distribution control. Moreover, an almost prism-shaped light transmitting member 30 is provided in the vicinity of the upper end of the outer peripheral edge portion of a projection lens 28 between the projection lens 28 and the reflector 24, and a direct light from a light source 22a toward the upper space of the projection lens 28 is emitted forward to be deflected downward.

Consequently, it is possible to increase the amount of a light to be irradiated on the forward part of a vehicle, and furthermore, to carry out a deflection control for the direct light emitted from the light source 22a with high precision.

16 Claims, 11 Drawing Sheets

U.S. PATENT DOCUMENTS

| | | | |
|---|---|---|---|
| 6,994,460 B2* | 2/2006 | Yamamura | 362/539 |
| 7,168,832 B2* | 1/2007 | Komatsu et al. | 362/507 |
| 7,290,909 B2* | 11/2007 | Komatsu et al. | 362/538 |
| 2003/0076688 A1* | 4/2003 | Kobayashi | 362/510 |
| 2005/0190572 A1* | 9/2005 | Komatsu et al. | 362/538 |
| 2007/0159839 A1* | 7/2007 | Komatsu | 362/538 |

FOREIGN PATENT DOCUMENTS

| | | |
|---|---|---|
| JP | 4-39137 A | 2/1992 |
| JP | 10-22302 A | 1/1998 |
| JP | 2001-229715 A | 8/2001 |

* cited by examiner

VEHICLE HEADLAMP

This application claims foreign priority based on Japanese Patent application No. 2004-056873, filed Mar. 1, 2004, the contents of which is incorporated herein by reference in its entirety.

BACKGROUND OF THE INVENTION

1. Field of the Invention

The present invention relates to so-called projector type vehicle headlamp.

2. Description of the Related Art

In general, a projector type vehicle headlamp has such a structure that a projection lens is provided on an optical axis extended in the longitudinal direction of the vehicle, and furthermore, a light source is provided on a rear side from a focal point on a back side thereof and a light emitted from the light source is reflected toward the optical axis by means of a reflector.

As disclosed in JP(UM) Hei 2-47704 and JP(A) 2001-229715, there described the structure of a so-called side insertion type lighting unit in which a light source is constituted by the light emitting portion of a light source bulb inserted and fixed into a reflector from the side of an optical axis in the projector type vehicle headlamp.

Moreover, JP (A) Hei 4-39137 or JP (A) Hei 10-223002 describes the structure of a lighting unit in which an annular light transmitting member is provided along the outer peripheral edge portion of a projector lens between the projector lens and a reflector in the projector type vehicle headlamp.

By employing the structure of the side insertion type lighting unit described in the JP(UM) Hei 2-47704 and the JP(A) 2001-229715, it is possible to decrease the longitudinal length of the lighting unit, thereby causing the lighting unit to be compact. Since the light source bulb is inserted and fixed into the reflector over the same horizontal plane, there are the following problems.

More specifically, in the projector type vehicle headlamp, an optical-axis side region in the reflecting plane of the reflector is suitable for forming the diffusing region of a light distribution pattern. In this case, however, the light source bulb is inserted and fixed into the reflector over the same horizontal plane as the optical axis, resulting in a hole for inserting and fixing the light source bulb being formed on the optical-axis side region of the reflecting plane. For this reason, the optical-axis side region cannot be utilized effectively for a light distribution control. Therefore, there is a problem in that it is hard to maintain sufficient amount of the brightness of the diffusing region of the light distribution pattern.

On the other hand, in the structure of the side insertion type lighting unit, if the annular light transmitting member described in JP-A-4-39137 or JP-A-10-223002 is provided, a direct light emitted from the light source toward the outer peripheral space of the projection lens can be irradiated on the forward part of the lighting unit. Consequently, it is possible to effectively utilize the luminous flux of the light source and to increase the amount of a light to be irradiated on the forward part of the vehicle.

In the structure of the side insertion type lighting unit, however, there is a problem in that the irradiated light cannot be controlled by the annular light transmitting member with high precision if the annular light transmitting member is simply provided.

SUMMARY OF THE INVENTION

The invention has been made in consideration of such circumstances, and has an object to provide a vehicle headlamp which can maintain sufficient amount of brightness in the diffusing region of a light distribution pattern and can increase the light amount to be irradiated on the forward part of the vehicle, and furthermore, can control the irradiated light with high precision even though the structure of the side insertion type lighting unit is employed in the projector type vehicle headlamp.

The invention provides a structure in which the inserting and fixing position of a light source bulb with respect to a reflector is devised and a predetermined light transmitting member is provided, thereby achieving the object.

More specifically, a vehicle headlamp according to the invention comprises a projection lens provided on an optical axis extended in a longitudinal direction of the vehicle, a light source provided on a rear side from a focal point on a rear side of the projection lens, and a reflector for forward reflecting a light from the light source toward the optical axis, wherein the light source is constituted by a light emitting portion of a light source bulb inserted and fixed into the reflector from a side of the optical axis in a position placed downward from the optical axis, and a prism-like shaped light transmitting member for emitting forwardly a direct light from the light source toward an upper space of the projection lens so as to be deflected downward is provided in the vicinity of an upper end of an outer peripheral edge portion of the projection lens between the projection lens and the reflector.

A light distribution pattern formed by the irradiation of a light from the vehicle headlamp according to the invention may be a light distribution pattern for a low beam, a light distribution pattern for a high beam or another light distribution pattern.

The type of the "light source bulb" is not particularly restricted but a discharge bulb and a halogen bulb can be employed, for example.

While the light source bulb is inserted and fixed into the reflector in "a position placed downward apart from the optical axis", the amount of a downward displacement from the optical axis in the inserting and fixing position is not particularly restricted. In that case, the amount of the downward displacement is preferably set to have a value of 10 mm or more, and more preferably, a value of 15 mm or more in respect of the prevention of a light emitted from the light source bulb and reflected in a region provided in the vicinity of the optical axis in the reflecting plane of the reflector from being shielded by the light source bulb. On the other hand, it is preferable that the amount of the downward displacement should be set to have a value of 30 mm or less in respect of the sufficient maintenance of an incident luminous flux on the reflecting plane of the reflector from the light source bulb.

The "light transmitting member" is an almost prism-shaped member provided in the vicinity of the upper end of the outer peripheral edge portion of a projection lens between the projection lens and the reflector. If the light transmitting member has such a structure that a direct light from the light source toward the upper space of the projection lens is emitted forward to be deflected downward, a specific structure such as a material or a shape is not particularly restricted. If the "light transmitting member" is constituted to downward deflect the direct light emitted from the light source, moreover, a light deflection angle in a horizontal direction is not particularly restricted.

As indicated in the structure, the vehicle headlamp according to the invention is constituted as the projector type vehicle headlamp. The light source bulb is inserted and fixed into the reflector from the side of the optical axis extended in the longitudinal direction of the vehicle. Therefore, the longitudinal length of a lighting unit can be reduced and the lighting unit can be thus compact.

In that case, the light source bulb is inserted and fixed in the position placed downward apart from the optical axis. Therefore, the optical-axis side region in the reflecting plane of the reflector can be effectively utilized for a light distribution control. It is possible to form the diffusing region of a light distribution pattern by a light reflected from the optical-axis side region, thereby maintaining a sufficient brightness in the diffusing region.

Moreover, the almost prism-shaped light transmitting member for forward emitting the direct light from the light source toward the upper space of the projection lens is provided between the projection lens and the reflector. Therefore, it is possible to correspondingly increase the amount of the light to be irradiated on the forward part of the vehicle. Consequently, it is possible to increase the brightness of the light distribution pattern by adding an additional light distribution pattern formed by the direct light emitted from the light source and transmitted through the light transmitting member to a basic light distribution pattern formed by the light from the light source which is reflected by the reflector and is transmitted through the projection lens.

In addition, the light transmitting member is provided in the vicinity of the upper end of the outer peripheral edge portion of the projection lens. Consequently, the direct light emitted from the light source is deflected downward. Therefore, it is possible to obtain the following functions and advantages.

More specifically, the vehicle headlamp according to the invention has the light source provided in the position which is placed downward apart from the optical axis. Therefore, the optical-axis side region in the reflecting plane of the reflector can be utilized effectively for the light distribution control. On the other hand, it is hard to reflect, by the reflector, a light emitted forward, obliquely and upward from the light source and to cause the light to be incident on the projection lens. Even if the light is incident on the projection lens, moreover, the light emitted from the projection lens becomes a very downward light. Therefore, the light is improper for forming a light distribution pattern.

If the almost prism-shaped light transmitting member is provided in the vicinity of the upper end of the outer peripheral edge portion of the projection lens between the projection lens and the reflector and the direct light from the light source toward the upper space of the projection lens is emitted forward to be deflected downward by the light transmitting member, therefore, it is possible to form an additional light distribution pattern in a position contributing to an increase in the brightness of the light distribution pattern. In addition, the light transmitting member is positioned sufficiently apart from the light source obliquely and upward. Therefore, it is possible to carry out a deflection control for the direct light emitted from the light source with high precision.

According to the invention, thus, also in the case in which the structure of the side insertion type lighting unit is employed in the projector type vehicle headlamp, the brightness of the diffusing region of the light distribution pattern can be sufficiently maintained, and furthermore, the amount of a light to be irradiated on the forward part of the vehicle can be increased and the irradiated light can be controlled with high precision.

While a large number of light source bulbs have light emitting portions constituted as linear light sources extended in the direction of the central axis of the bulb, the additional light distribution pattern becomes an oblong light distribution pattern as an aggregation of the image of an oblong linear light source if the light source bulb is used in the invention. Therefore, it is possible to prevent a light distribution unevenness from being generated on the forward road surface of a vehicle, and furthermore, to increase the brightness of the light distribution pattern.

Although the specific structure of the light transmitting member is not particularly restricted to the structure as described above, it is possible to cause the structure of a lighting unit to be compact, and furthermore, to effectively utilize the luminous flux of the light source with such a structure that the light transmitting member is provided along the outer peripheral edge portion of the projection lens.

If the surface shape of the emitting plane of the light transmitting member is set to be a convex curved shape in the structure, moreover, it is possible to harmonize the same shape with the surface shape of the projection lens in respect of a design.

With a structure of a so-called reflection prism type which includes, as a light transmitting member, an internal reflecting plane for internally reflecting a direct light emitted from the light source and incident on the light transmitting member toward an emitting plane, furthermore, a light incidence angle on the emitting plane can be more reduced as compared with a structure of a so-called refractive prism type in which the direct light transmitted from the light source and incident on the light transmitting member is directly emitted.

Consequently, it is possible to enhance the degree of freedom of the shapes of the incidence plane and the emitting plane within a range in which a total reflection is not caused over the emitting plane of the light transmitting member. Consequently, the deflection control for the direct light emitted from the light source can be carried out with higher precision. Moreover, the degree of freedom of the shapes of the incidence plane and the emitting plane can be thus enhanced. Consequently, the amount of the light incident on the light transmitting member can be increased. Thus, the effective utilization rate of the luminous flux of the light source can be increased.

The "internal reflecting plane" may be a normal reflecting plane subjected to mirror finishing by aluminum deposition or may be a total reflecting plane formed to internally reflect the direct light emitted from the light source by a total reflection.

In this case, if the vertical sectional shape of the incidence plane of the light transmitting member is set to be the shape of an almost circular arc with the light source to be a center, it is possible to exactly move the direct light from the light source almost straight over the incidence plane of the light transmitting member with a rare refraction. Consequently, it is possible to easily carry out the light deflection control by the light transmitting member with high precision.

In this case, if the vertical sectional shape of the internal reflecting plane of the light transmitting member is set to be an almost hyperbolic shape having a predetermined point positioned above the optical axis to be a conjugate focal point with the light source and the vertical sectional shape of the emitting plane of the light transmitting member is set to be an almost elliptical shape with the predetermined point to be a focal point, furthermore, a light reflected from the internal reflecting plane can be an almost divergent light from the predetermined point and the light emitted from the emitting plane can be an almost parallel light in a vertical plane. Consequently, the additional light distribution pattern can be a light distribution pattern having a small vertical width. Thus, it is possible to prevent a light distribution unevenness from being generated on the forward road surface of a vehicle.

Instead of the foregoing, alternatively, also in the case in which an additional reflector for reflecting the direct light from the light source toward the incidence plane of the light transmitting member is provided on the rear side of the light transmitting member and the vertical sectional shape of the reflecting plane of the additional reflector is set to be the almost hyperbolic shape having the predetermined point positioned above the optical axis to be the conjugate focal point with the light source, and furthermore, the vertical sectional shape of the incidence plane of the light transmitting member is set to be the shape of an almost circular arc with the predetermined point to be a center, the deflection control of the light transmitting member with respect to the direct light emitted from the light source can be carried out easily with high precision, and furthermore, the amount of a light incident on the light transmitting member can be increased to enhance the effective utilization rate of the luminous flux of the light source and it is possible to cause the additional light distribution pattern to be a light distribution pattern having a small vertical width by setting the light emitted from the emitting plane to be an almost parallel light in the vertical plane.

In the structure in which a shade for shielding a part of a light reflected from the reflector is provided in the vicinity of the focal point on the rear side of the projection lens in such a manner that the upper edge of the shade is positioned in the vicinity of the optical axis, moreover, a light distribution pattern for a low beam having a cutoff line on the upper edge can be formed. In such a case, however, the luminous flux of the light source is partially lost by the presence of the shade. For this reason, it is particularly effective that the structure according to the invention is employed to effectively utilize the residual luminous flux of the light source in order to sufficiently maintain the brightness of the light distribution pattern for a low beam.

In addition, it is possible to obtain the following functions and advantages in such a case.

More specifically, generally, in the projector type lighting unit having such a structure as to irradiate a light for forming a light distribution pattern for a low beam, only the projection lens portion is seen to be bright with a high luminance when a forward irradiated light comes into the eyes of a driver running in an opposite direction due to a change in the posture of a vehicle. For this reason, there is a possibility that a glare might be given to the driver running in the opposite direction. On the other hand, if the light transmitting member is provided in the vicinity of the upper end of the outer peripheral edge portion of the projection lens, the vicinity of the upper end of the outer peripheral edge portion of the projection lens can be seen to be slightly bright when the forward irradiated light comes into the eyes of the driver running in the opposite direction. Therefore, it is possible to relieve the contrast of the brightness between the projection lens and surroundings thereof. Consequently, it is possible to reduce the glare to be given to the driver running in the opposite direction.

In this case, with a structure in which the light transmitting member is provided with an upper irradiating lens portion to emit a direct light from a light source as an upward light from an optical axis, it is possible to form a light distribution pattern for an overhead sign irradiation to irradiate an overhead sign in the forward part of a vehicle running road.

DESCRIPTION OF THE PREFERRED EMBODIMENTS

Embodiments of the present invention will be described hereinbelow by reference to the drawings. Unless otherwise specifically defined in the specification, terms have their ordinary meaning as would be understood by those of ordinary skill in the art.

An embodiment of the invention will be described below with reference to the drawings.

Figure 1:
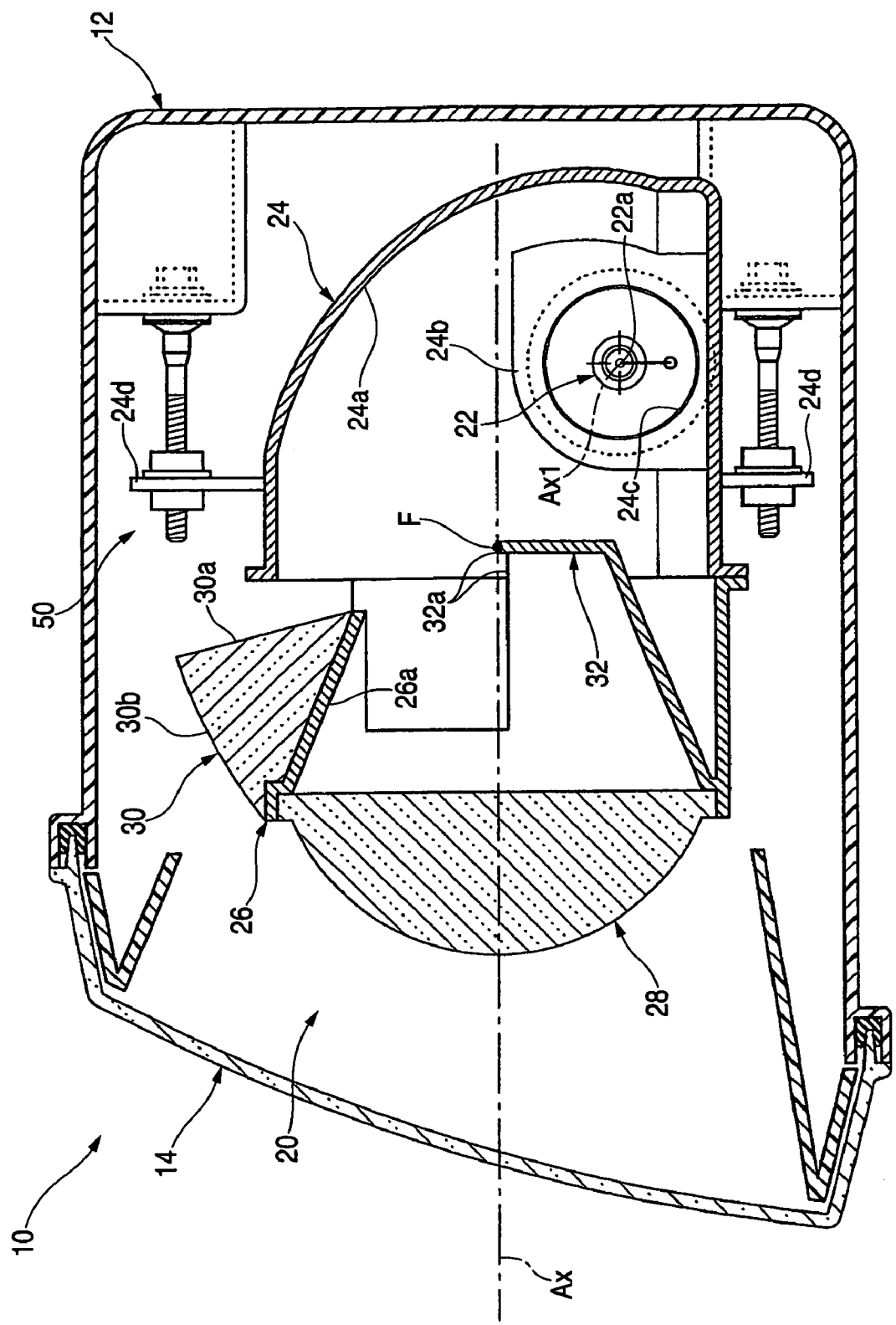
FIG. 1 is a sectional side view showing a vehicle headlamp according to a first embodiment of the invention.

FIG. 1 is a sectional side view showing a vehicle headlamp according to an embodiment of the invention.

As shown in FIG. 1, in a headlamp 10 for a vehicle according to the embodiment, a lighting unit 20 having an optical axis Ax extended in the longitudinal direction of the vehicle is accommodated tiltably in vertical and transverse directions through an aiming mechanism 50 in a lamp housing formed by a lamp body 12 and a translucent cover 14 attached to an opening portion on a front end thereof.

At a stage in which the aiming adjustment of the aiming mechanism 50 is completed, the optical axis Ax of the lighting unit 20 is extended in a downward direction by approximately 0.5 to 0.6 degree with respect to the longitudinal direction of the vehicle.

Figure 2:
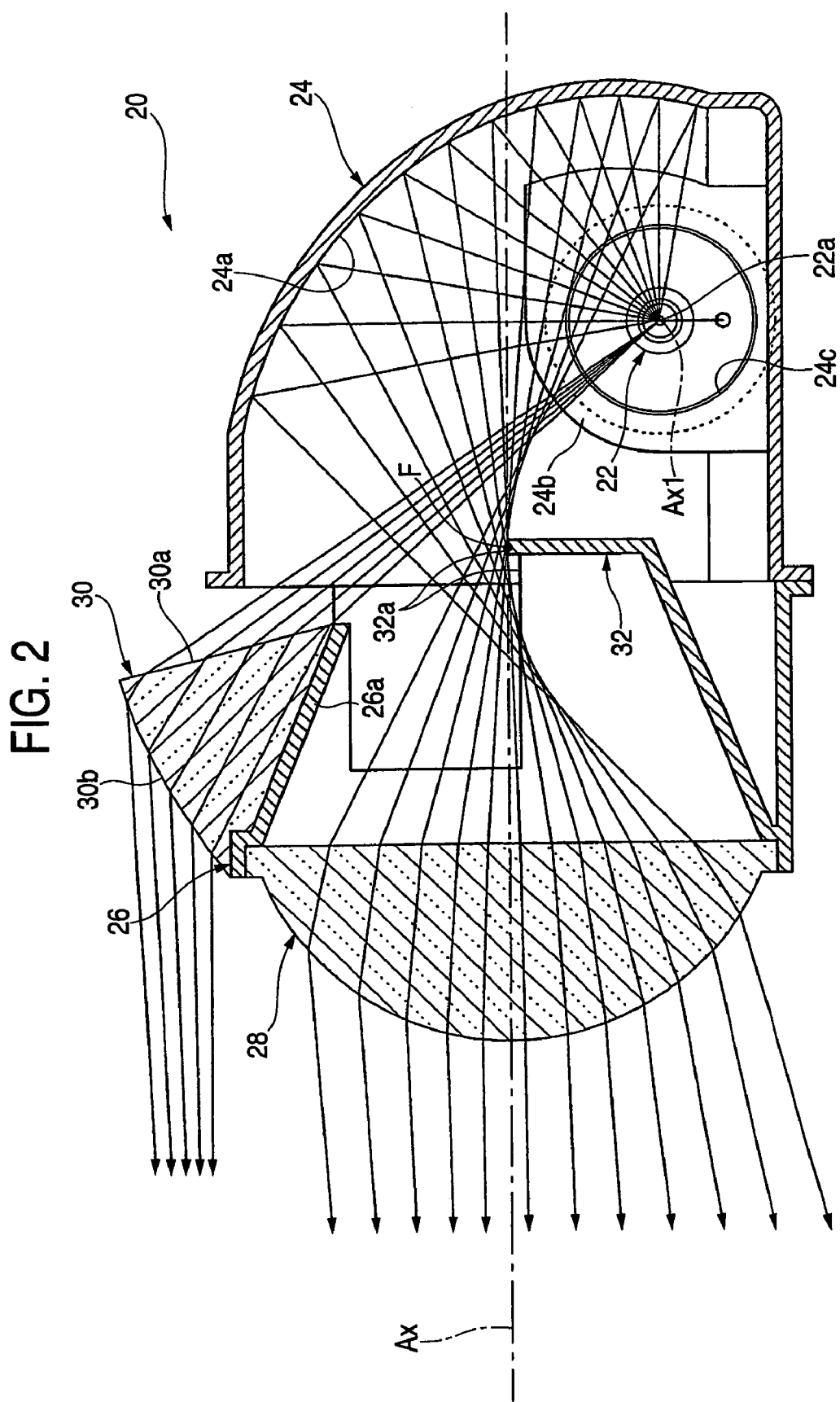
FIG. 2 is a sectional side view showing, as a single unit, a lighting unit in the vehicle headlamp.
Figure 3:
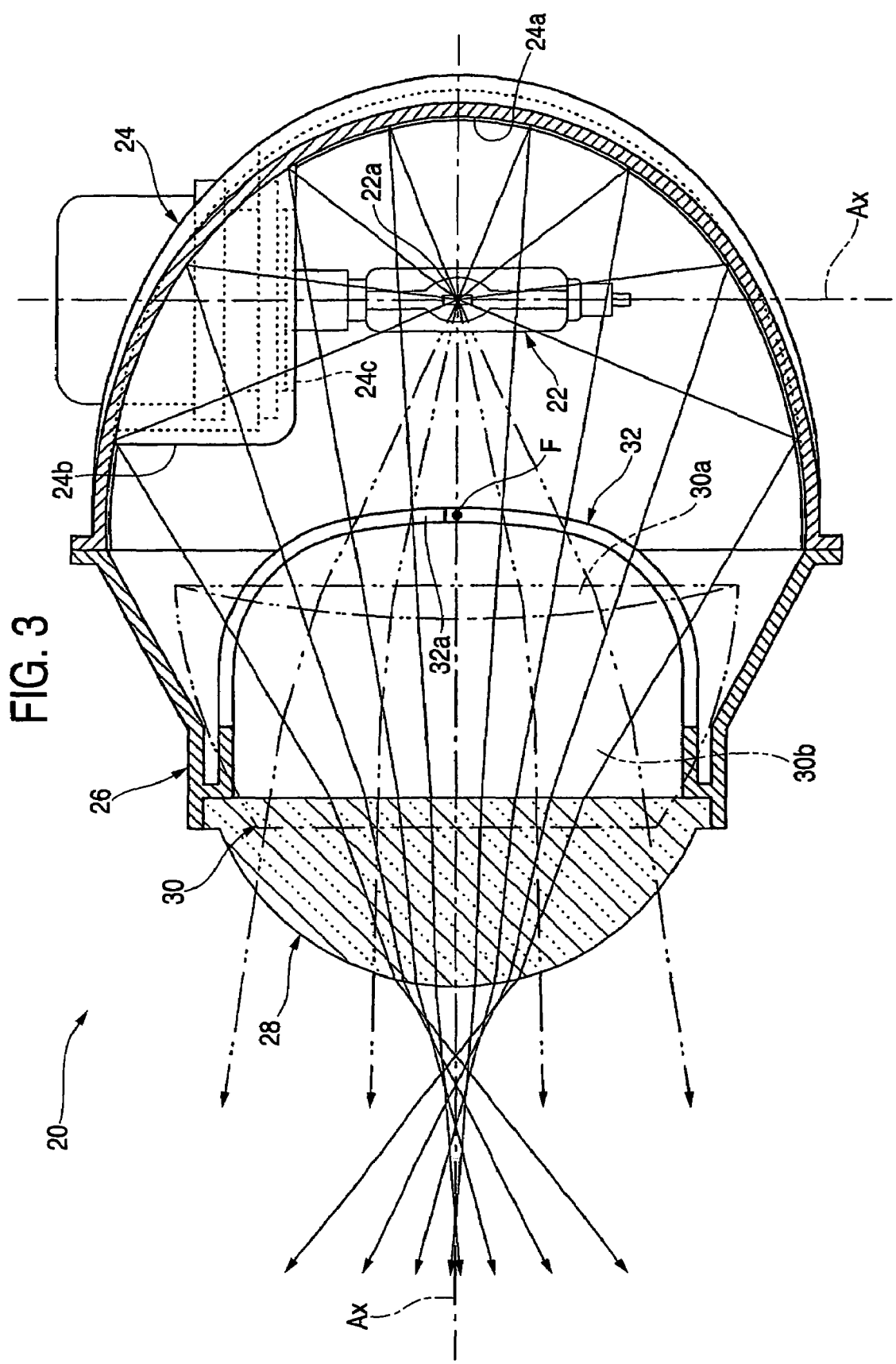
FIG. 3 is a sectional plan view showing the lighting unit as a single unit.
Figure 4:
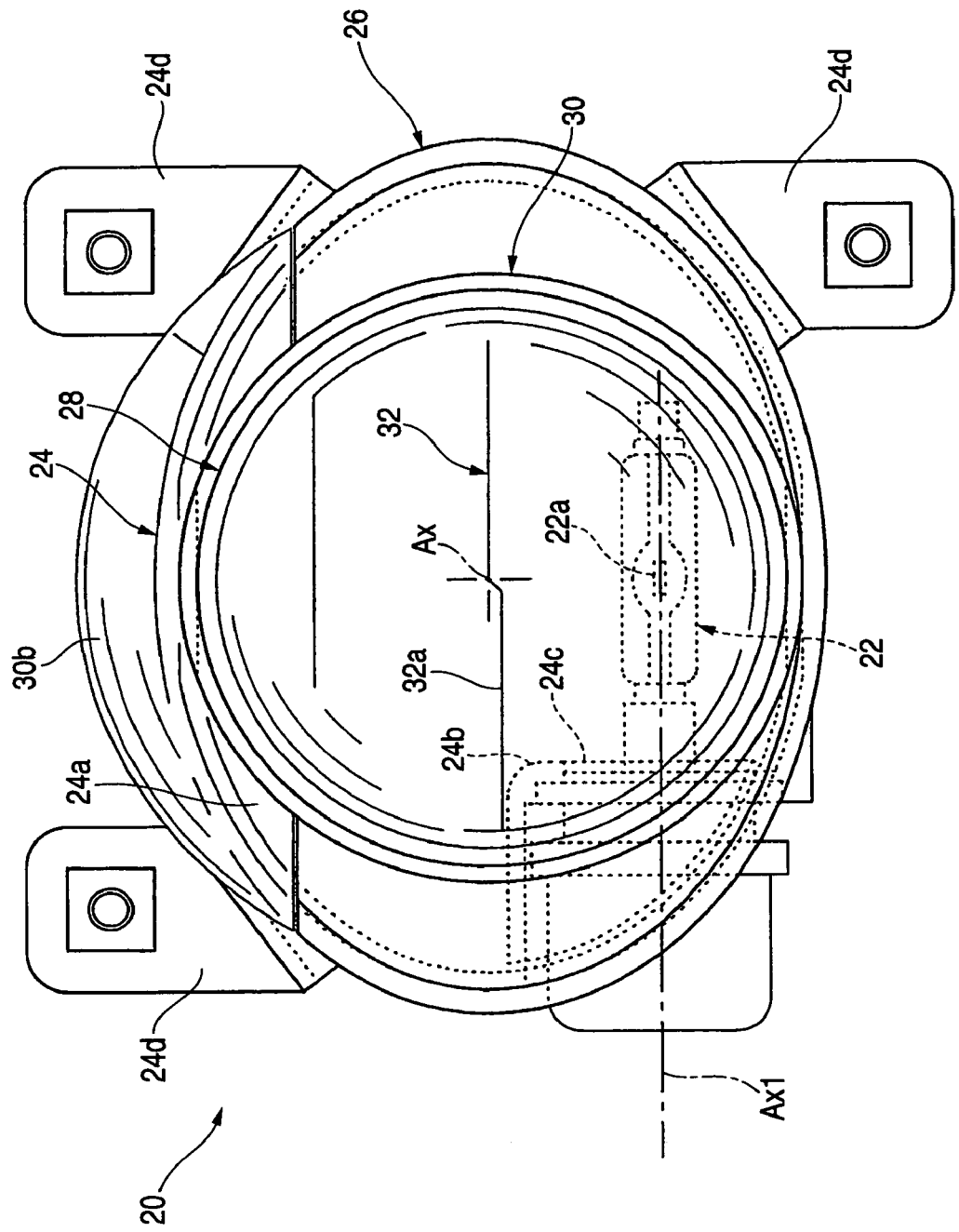
FIG. 4 is a front view showing the lighting unit as a single unit.

FIGS. 2, 3 and 4 are a sectional side view, a sectional plan view and a front view which show the lighting unit 20 as a single unit.

As shown in these drawings, the lighting unit 20 is a projector type lighting unit constituted to irradiate a light for forming a light distribution pattern for a low beam and comprises a light source bulb 22, a reflector 24, a holder 26, a projection lens 28, a light transmitting member 30, and a shade 32.

The projection lens 28 is a planoconvex lens having a surface on a forward side to be a convex plane and a surface on a rear side to be a plane, and is provided on the optical axis Ax. The projection lens 28 serves to forward project, as a reversed image, an image on a focal plane including a focal point F on a rear side thereof.

The light source bulb 22 is a discharge bulb such as a metal halide bulb using a discharge light emitting portion to be a light source 22a, and the light source 22a is constituted as a linear light source extended in the direction of a central axis Ax1 of the bulb. The light source bulb 22 is inserted and fixed into the reflector 24 from the right side of the optical axis Ax in a position placed downward apart from the optical axis Ax behind the focal point F on the rear side of the projection lens 28 (for example, a position placed downward apart from the optical axis Ax by approximately 20 mm). The insertion and fixation is carried out to position the center of the light emission of the light source 22a vertically and downward from the optical axis Ax in a state in which the central axis Ax1 of the bulb is extended in a horizontal direction in a vertical plane which is orthogonal to the optical axis Ax.

The reflector 24 has a reflecting plane 24a for forward reflecting a light emitted from the light source 22a toward the optical axis Ax. The reflecting plane 24a has an almost elliptical sectional shape, and an eccentricity thereof is set to be gradually increased from a vertical section toward a horizontal section. Consequently, a light emitted from the light source 22a and reflected by the reflecting plane 24a is almost converged in the vicinity of the focal point F on a rear side in the vertical section, and furthermore, a converging position thereof is moved very forward in the horizontal section.

A bulb inserting and fixing portion 24b is formed to be protruded from the reflecting plane 24a in the lower right region of the reflecting plane 24a in the reflector 24, and a bulb insertion hole 24c is formed in the left side portion of the bulb inserting and fixing portion 24b. The reflector 24 is supported on the lamp body 12 through the aiming mechanism 50 in an aiming bracket 24d formed in three portions thereof.

A holder 26 is formed to be forward extended almost cylindrically from an opening portion on the front end of the reflector 24, and is fixed and supported onto the reflector 24 at a rear end thereof, and furthermore, fixes and supports the projection lens 28 at a front end thereof. In the holder 26, the upper region of the optical axis Ax is cut away over a predetermined range. Moreover, the internal space of the holder 26 is provided with an inner cylinder portion 26a extended rearward from the front end of the holder 26.

The shade 32 is formed integrally with the inner cylinder portion 26a of the holder 26 so as to be positioned in almost a lower half part in the internal space of the holder 26. The shade 32 is formed in such a manner that an upper edge 32a passes through the focal point F on the rear side of the projection lens 28, and consequently, shields a part of a light reflected from the reflecting plane 24a of the reflector 24 and removes most of an upward light emitted forward from the projection lens 28. In that case, the upper edge 32a of the shade 32 is extended like an almost circular arc in a horizontal direction along a focal plane on the rear side of the projection lens 28 and is formed to be laterally uneven.

The light transmitting member 30 is an almost prism-shaped member for forward emitting a direct light from the light source 22a toward the upper space of the projection lens 28 so as to deflect the same light downward, and is provided along the outer peripheral edge portion of the projection lens 28 in the vicinity of the upper end of the outer peripheral edge portion of the projection lens 28 between the projection lens 28 and the reflector 24 and is fixed to the outer peripheral surface of the inner cylinder portion 26a of the holder 26.

The surface shape of an incidence plane 30a of the light transmitting member 30 is set to be a planar shape which is slightly inclined to a forward side with respect to a vertical plane which is orthogonal to the optical axis Ax. On the other hand, the surface shape of an emitting plane 30b of the light transmitting member 30 is set to be such a convex curved shape as to refract the direct light from the light source 22a which is refracted by the incidence plane 30a and is incident on the light transmitting member 30 in a slightly downward direction with respect to the optical axis Ax.

In that case, the emitting plane 30b of the light transmitting member 30 has a vertical sectional shape and a horizontal sectional shape set to emit, from the emitting plane 30b, the direct light from the light source 22a which is incident on the light transmitting member 30 as an almost parallel light which is rarely diffused in a vertical direction and as a diffused light which is diffused to some extent in a transverse direction.

Figure 5:
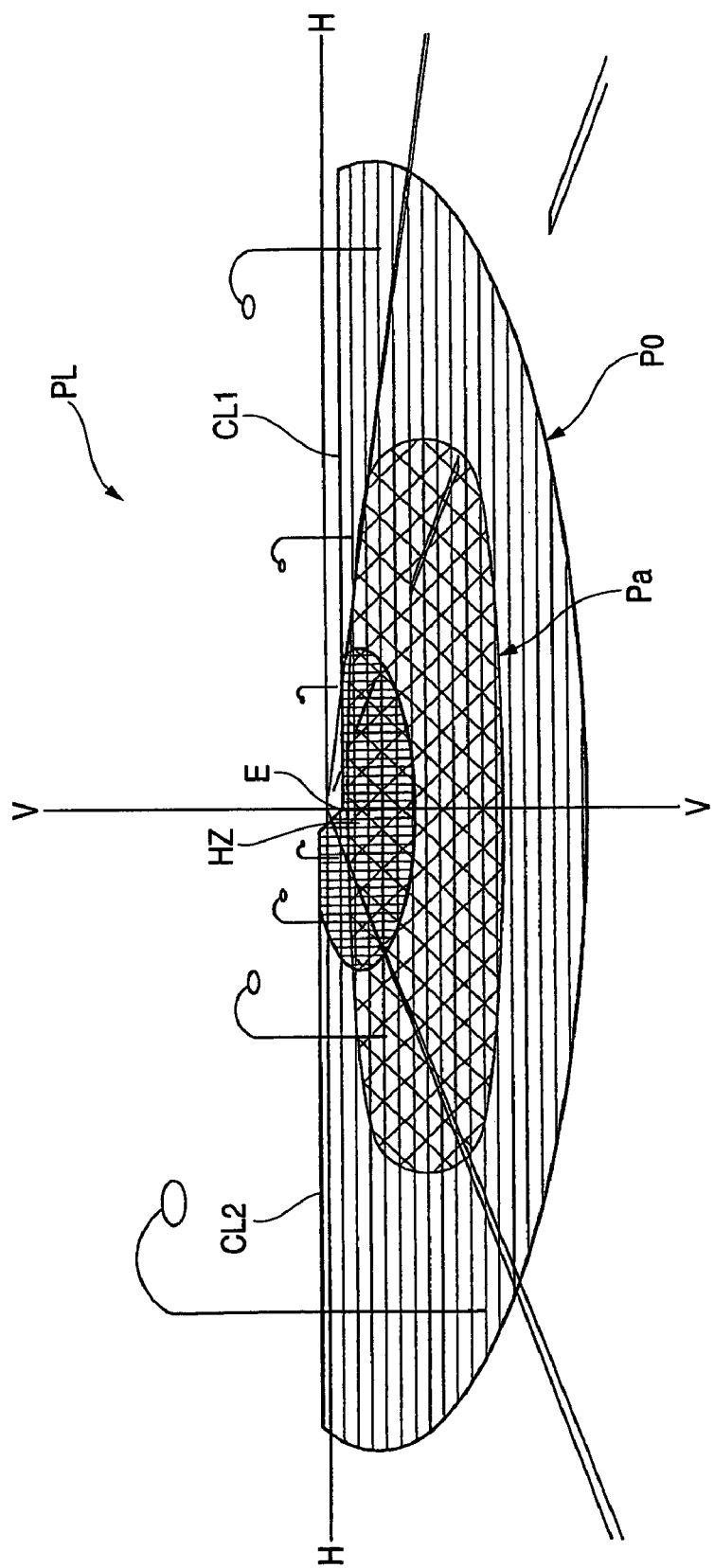
FIG. 5 is a perspective view showing a light distribution pattern formed on a virtual vertical screen provided in a forward position of 25 m from a lighting unit by a light irradiated forward from the lighting unit in the vehicle headlamp.

FIG. 5 is a perspective view showing a light distribution pattern for a low beam which is formed on a virtual vertical screen provided in a forward position of 25 m from a lighting unit by a light irradiated forward from the headlamp 10 for a vehicle.

As shown in FIG. 5, a light distribution pattern PL for a low beam is a left light distribution pattern for a low beam and has laterally uneven cutoff lines CL1 and CL2 on an upper edge thereof. The cutoff lines CL1 and CL2 are extended in a horizontal direction to be laterally uneven by setting, as a boundary, a V-V line which vertically passes through H-V to be a vanishing point in the front direction of the lighting unit. An opposite lane side portion on the right side of the V-V line is formed as the cutoff line CL1 in a lower stage and a self-lane side portion on the left side of the V-V line is formed as the cutoff line CL2 in an upper stage which is provided to have a step through an inclined portion from the cutoff line CL1 in the lower stage. In the light distribution pattern PL for a low beam, the position of an elbow point E to be the intersecting point of the cutoff line CL1 in the lower stage and the V-V line is set to a downward position of approximately 0.5 to 0.6 degree from H-V and a hot zone HZ to be a region having a high luminous intensity is formed to surround the elbow point E.

The light distribution pattern PL for a low beam is constituted as a synthetic light distribution pattern of a basic light distribution pattern P0 and an additional light distribution pattern Pa.

The basic light distribution pattern P0 gives the basic shape of the light distribution pattern PL for a low beam, and is formed by the light from the light source 22a which is reflected by the reflector 24 and is transmitted through the projection lens 28. More specifically, the basic light distribution pattern P0 is formed by projecting the image of the light source 22a provided on a focal plane at the rear side of the projection lens 28 with the light from the light source 22a which is reflected by the reflecting plane 24a of the reflector 24 as a reverse projected image onto the virtual vertical screen, and the cutoff lines CL1 and CL2 are formed as the reverse projected image of the upper edge 32a of the shade 32.

The additional light distribution pattern Pa is formed by the direct light which is emitted from the light source 22a and is transmitted through the light transmitting member 30, and is constituted as an oblong light distribution pattern expanded at some diffusion angle toward both left and right sides of the V-V line. In that case, the additional light distribution pattern Pa is formed in such a manner that an upper edge thereof is positioned slightly below the cutoff line CL1 in the lower stage.

As described above in detail, the headlamp 10 for a vehicle according to the embodiment is constituted as the projector type vehicle headlamp which irradiates a light to form the light distribution pattern PL for a low beam, and the light source bulb 22 is inserted and fixed into the reflector 24 from the side of the optical axis Ax extended in the longitudinal direction of the vehicle. Therefore, the longitudinal length of the lighting unit can be reduced so that the lighting unit can be compact.

In that case, the light source bulb 22 is inserted and fixed in the position placed downward apart from the optical axis Ax. Therefore, the optical-axis side region in the reflecting plane 24a of the reflector 24 can be effectively utilized for a light distribution control. It is possible to form the diffusing region of the light distribution pattern PL for a low beam by a light reflected from the optical-axis side region, thereby maintaining a sufficient brightness in the diffusing region.

Moreover, the almost prism-shaped light transmitting member 30 for forward emitting the direct light from the light source 22a toward the upper space of the projection lens 28 is provided between the projection lens 28 and the reflector 24. Therefore, it is possible to correspondingly increase the amount of the light to be irradiated on the forward part of the vehicle. Consequently, it is possible to increase the brightness of the light distribution pattern PL for a low beam by adding the additional light distribution pattern Pa formed by the direct light emitted from the light source 22a and transmitted through the light transmitting member 30 to the basic light distribution pattern P0 formed by the light from the light source 22a which is reflected by the reflector 24 and is transmitted through the projection lens 28.

In addition, the light transmitting member 30 is provided in the vicinity of the upper end of the outer peripheral edge portion of the projection lens 28. Consequently, the direct light emitted from the light source 22a is deflected downward. Therefore, it is possible to obtain the following functions and advantages.

More specifically, the light source 22a is provided in the position placed downward apart from the optical axis Ax. Therefore, the optical-axis side region in the reflecting plane 24a of the reflector 24 can be utilized effectively for the light distribution control. On the other hand, it is hard to reflect, by the reflector 24, a light emitted forward, obliquely and upward from the light source 22a and to cause the light to be incident on the projection lens 28. Even if the light is incident on the projection lens 28, moreover, the light emitted from the projection lens 28 becomes a very downward light. Therefore, the light is improper for forming the light distribution pattern PL for a low beam.

As in the embodiment, if the almost prism-shaped light transmitting member 30 is provided in the vicinity of the upper end of the outer peripheral edge portion of the projection lens 28 between the projection lens 28 and the reflector 24 and the direct light from the light source 22a toward the upper space of the projection lens 28 is emitted forward to be deflected downward by the light transmitting member 30, therefore, it is possible to form the additional light distribution pattern Pa in the position contributing to an increase in the brightness of the light distribution pattern PL for a low beam. In addition, the light transmitting member 30 is positioned sufficiently apart from the light source 22a obliquely and upward. Therefore, it is possible to carry out a deflection control for the direct light emitted from the light source 22a with high precision.

According to the embodiment, thus, in the case in which the structure of a side insertion type lighting unit is employed in the projector type vehicle headlamp, the brightness of the diffusing region of the light distribution pattern PL for a low beam can be sufficiently maintained, and furthermore, the amount of a light to be irradiated on the forward part of the vehicle can be increased and the irradiated light can be controlled with high precision.

In the embodiment, particularly, the light emitting portion of the light source bulb 22 forming the light source 22a is constituted as the linear light source extended in the direction of the central axis Ax of the bulb. Therefore, the additional light distribution pattern Pa can be formed as an oblong light distribution pattern to be an aggregation of the image of an oblong linear light source. Consequently, it is possible to prevent a light distribution unevenness from being generated on the forward road surface of a vehicle, and furthermore, to increase the brightness of the light distribution pattern PL for a low beam.

The lighting unit 20 according to the embodiment is seen to be bright with a high luminance in only the projection lens 28 portion when a forward irradiated light comes into the eyes of a driver running in an opposite direction due to a change in the posture of a vehicle. For this reason, there is a possibility that a glare might be given to the driver running in the opposite direction. In the lighting unit 20 according to the embodiment, however, the light transmitting member 30 provided in the vicinity of the upper end of the outer peripheral edge portion of the projection lens 28 is seen to be slightly bright when the forward irradiated light comes into the eyes of the driver running in the opposite direction. Therefore, it is possible to relieve the contrast of the brightness between the projection lens 28 and surroundings thereof. Consequently, it is possible to reduce the glare to be given to the driver running in the opposite direction.

In the embodiment, moreover, the light transmitting member 30 is provided along the outer peripheral edge portion of the projection lens 28. Therefore, it is possible to cause the structure of the lighting unit to be compact, and furthermore, to effectively utilize the luminous flux of the light source.

In the embodiment, furthermore, the surface shape of the emitting plane 30b of the light transmitting member 30 is set to be a convex curved shape. Therefore, it is possible to harmonize the same shape with the surface shape of the projection lens 28 in respect of a design.

In the embodiment, moreover, the holder 26 is provided between the projection lens 28 and the light transmitting member 30. Therefore, the direct light emitted from the light source 22a can be prevented from being incident as a stray light on the light transmitting member 30.

Next, description will be given to a second embodiment of the invention.

Figure 6:
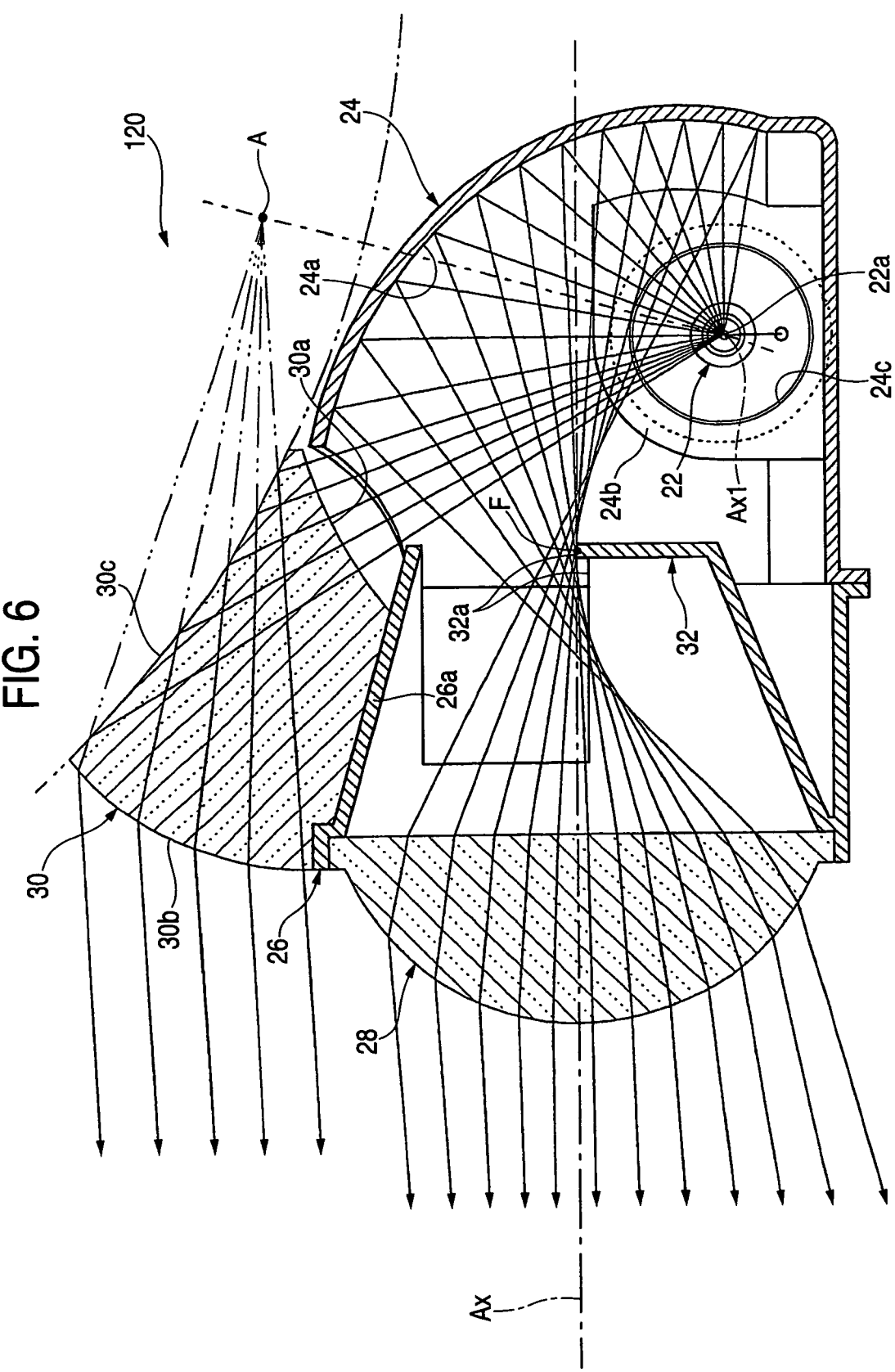
FIG. 6 is a sectional side view showing, as a single unit, a lighting unit in a vehicle headlamp according to a second embodiment of the invention.

FIG. 6 is a sectional side view showing, as a single unit, a lighting unit 120 of a vehicle headlamp according to the embodiment.

As shown in FIG. 6, the basic structure of the lighting unit 120 is entirely the same as that in the first embodiment, and the structure of a light transmitting member 30 is different from that in the first embodiment.

More specifically, the light transmitting member 30 according to the embodiment is constituted as a reflection prism type light transmitting member comprising an internal reflecting plane 30c for internally reflecting, toward an emitting plane 30b, a direct light emitted from a light source 22a and incident on the light transmitting member 30, and has the same vertical sectional shape extended in a transverse direction.

In that case, an incidence plane 30a of the light transmitting member 30 has a vertical sectional shape set to be the shape of a circular arc with the light source 22a to be a center. In the vertical plane, consequently, a direct light emitted from the light source 22a is exactly incident on the light transmitting member 30 without a refraction through the incidence plane 30a.

Moreover, the internal reflecting plane 30c of the light transmitting member 30 has a vertical sectional shape set to be a hyperbolic shape setting a predetermined point A positioned above an optical axis Ax to a conjugate focal point with the light source 22a. In the vertical plane, consequently, a light incident on the light transmitting member 30 is reflected as a divergent light from the predetermined point A by the internal reflecting plane 30c. In that case, the position of the predetermined point A is set to a slightly rear position from a central axis Ax1 of a bulb on almost the same level with the light transmitting member 30. Consequently, there is generated a hyperbolic shape in which the internal reflection of the internal reflecting plane 30c is carried out through a total reflection.

Furthermore, the emitting plane 30b of the light transmitting member 30 has a vertical sectional shape set to be an elliptical shape in which the predetermined point A acts as a focal point. Consequently, a light emitted from the emitting plane 30b is set to be an almost parallel light in a vertical plane. In that case, an eccentricity e of an ellipse constituting the vertical sectional shape of the emitting plane 30b is set to be the inverse number of a refractive index n of the light transmitting member (that is, e=1/n). Consequently, the degree of parallelism of the light emitted from the emitting plane 30b can be increased.

In the embodiment, the incidence plane 30a of the light transmitting member 30 is positioned rearward from that in the first embodiment, and the incidence plane 30a causes a direct light from the light source 22a to be incident on the light transmitting member 30 within a larger angle range than that in the first embodiment. In order to implement the incidence, a reflector 24 has an upper region on a front end which is cut away.

Figure 7:
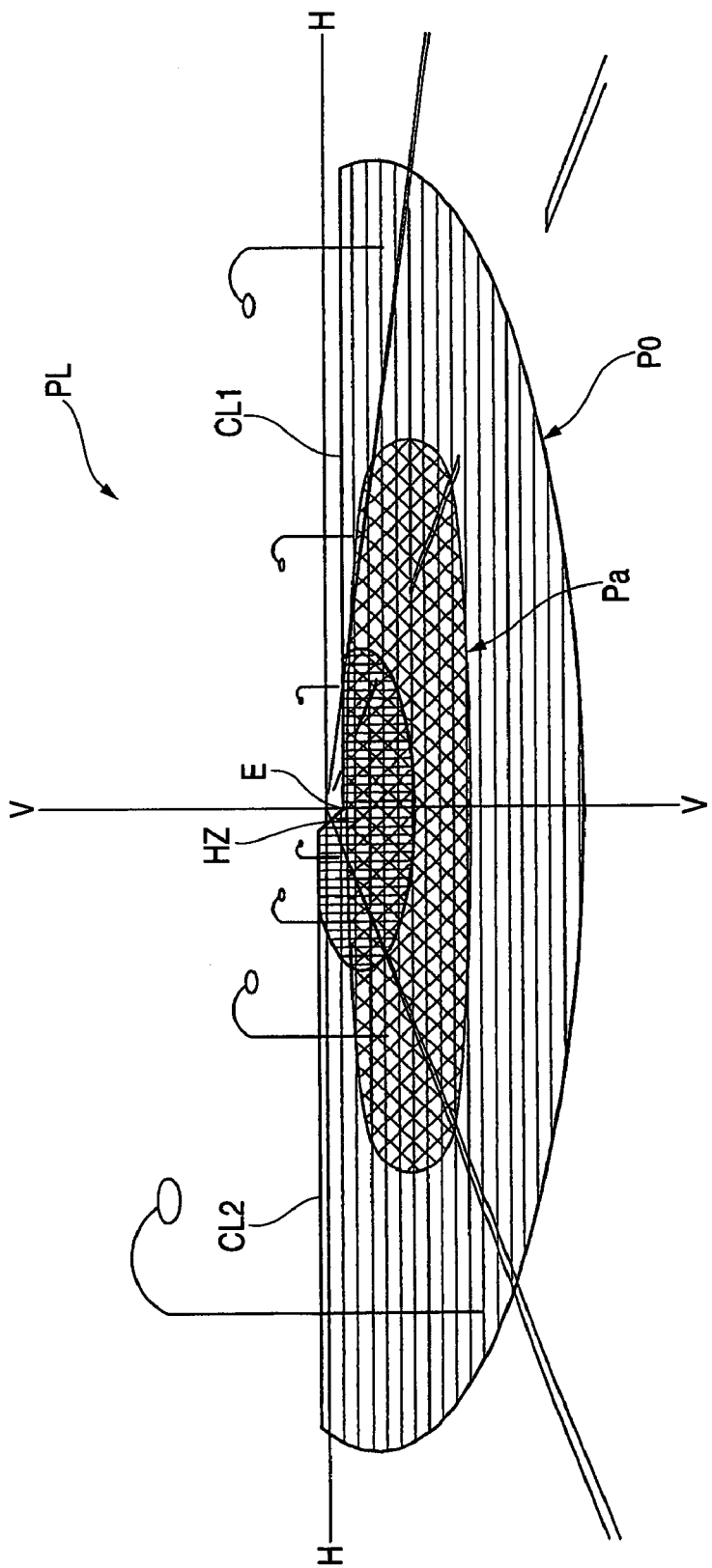
FIG. 7 is a perspective view showing a light distribution pattern formed on a virtual vertical screen by a light irradiated forward from the lighting unit illustrated in FIG. 6.

FIG. 7 is a perspective view showing a light distribution pattern PL for a low beam which is formed on the virtual vertical screen by a light irradiated forward from the lighting unit 120.

As shown in FIG. 7, a basic light distribution pattern P0 constituting the light distribution pattern PL for a low beam is entirely the same as that in the first embodiment and an additional light distribution pattern Pa is different from that in the first embodiment.

More specifically, the additional light distribution pattern Pa has a smaller vertical width and a greater brightness than the additional light distribution pattern Pa shown in FIG. 5.

Also in the case in which the structure according to the embodiment is employed, the direct light from the light source 22a toward the upper space of a projection lens 28 is emitted forward to be deflected downward by the light transmitting member 30 provided between the projection lens 28 and the reflector 24. Therefore, it is possible to obtain the same functions and advantages as those in the first embodiment.

In the embodiment, particularly, the light transmitting member 30 is constituted as a reflection prism type light transmitting member comprising the internal reflecting plane 30c. Therefore, it is possible to increase the degree of freedom of the shapes of the incidence plane 30a and the emitting plane 30b within such a range that a total reflection is not caused in the emitting plane 30b of the light transmitting member 30. Consequently, the direct light emitted from the light source 22a can be subjected to a deflection control with higher precision. Moreover, the degree of freedom of the shapes of the incidence plane 30a and the emitting plane 30b can be thus enhanced so that the amount of a light incident on the light transmitting member 30 can be increased. Consequently, it is possible to increase the effective utilization rate of the luminous flux of the light source.

In addition, referring to the vertical sectional shape of the light transmitting member 30, the incidence plane 30a is set to take the shape of a circular arc with the light source 22a to be a center, the internal reflecting plane 30c is set to take a hyperbolic shape in which the predetermined point A positioned above the optical axis Ax acts as a conjugate focal point with the light source 22a, and the emitting plane 30b is set to take an elliptical shape with the predetermined point A to be a focal point. Therefore, a light irradiated from the light transmitting member 30 can be an almost parallel light in the vertical plane. Consequently, the additional light distribution pattern Pa can be set to a light distribution pattern having a small vertical width. Thus, it is possible to prevent a light distribution unevenness from being generated on the forward road surface of a vehicle.

Furthermore, the internal reflecting plane 30c of the light transmitting member 30 is formed to internally reflect the direct light from the light source 22a through a total reflection. Therefore, it is possible to eliminate mirror finishing for the light transmitting member 30.

Next, description will be given to a third embodiment of the invention.

Figure 8:
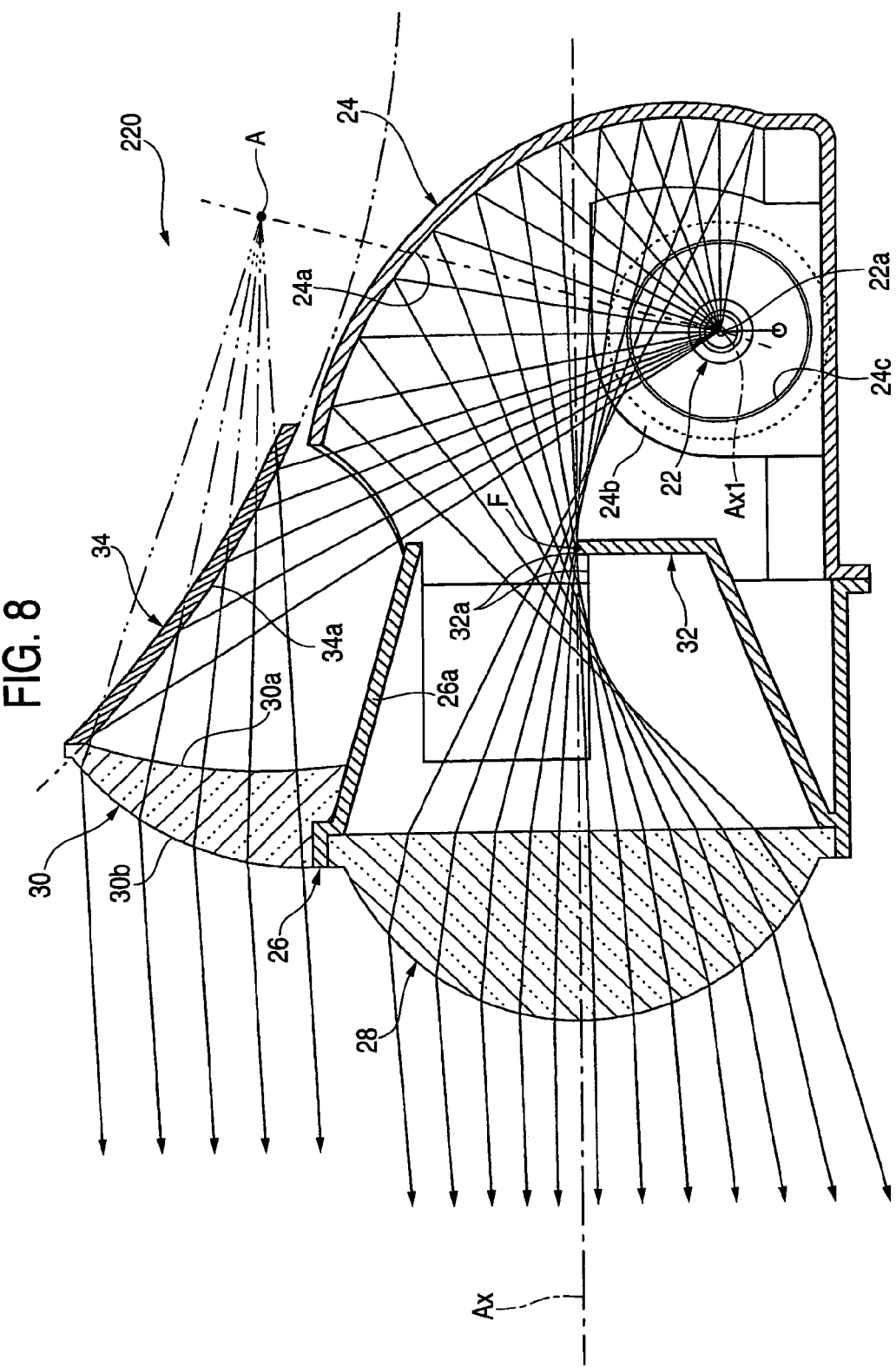
FIG. 8 is a sectional side view showing, as a single unit, a lighting unit in a vehicle head lamp according to a third embodiment of the invention.

FIG. 8 is a sectional side view showing, as a single unit, a lighting unit 220 of a vehicle headlamp according to the embodiment.

As shown in FIG. 8, the basic structure of the lighting unit 220 is entirely the same as that in the second embodiment, and the structure of a light transmitting member 30 is different from that in the second embodiment and is different from that in the second embodiment in that an additional reflector 34 is provided on the rear side of the light transmitting member 30.

The additional reflector 34 is constituted to reflect a direct light from a light source 22a toward the incidence plane of the light transmitting member 30. In that case, the vertical sectional shape of a reflecting plane 34a of the additional reflector 34 is set to be a hyperbolic shape in which a predetermined point A positioned above an optical axis Ax is a conjugate focal point with the light source 22a. In a vertical plane, consequently, the direct light emitted from the light source 22a is reflected as a divergent light from the predetermined point A through the reflecting plane 34a of the additional reflector 34. In that case, the position of the predetermined point A is set to be identical to that of the predetermined point A in the second embodiment.

Moreover, an incidence plane 30a of the light transmitting member 30 has a vertical sectional shape set to be the shape of a circular arc with the predetermined point A to be a center. In the vertical plane, consequently, the direct light emitted from the light source 22a is incident on the light transmitting member 30 without a refraction through the incidence plane 30a.

An emitting plane 30b of the light transmitting member 30 is set to have entirely the same shape as that of the light transmitting member 30 according to the first embodiment. Consequently, a light emitted from the emitting plane 30b is set to be an almost parallel light in the vertical plane.

Also in the case in which the structure according to the embodiment is employed, it is possible to obtain the same functions and advantages as those in the second embodiment. In that case, in the embodiment, the additional reflector 34 is required in addition to the light transmitting member 30, and the light transmitting member 30 can be thinned.

Next, description will be given to a fourth embodiment of the invention.

Figure 9:
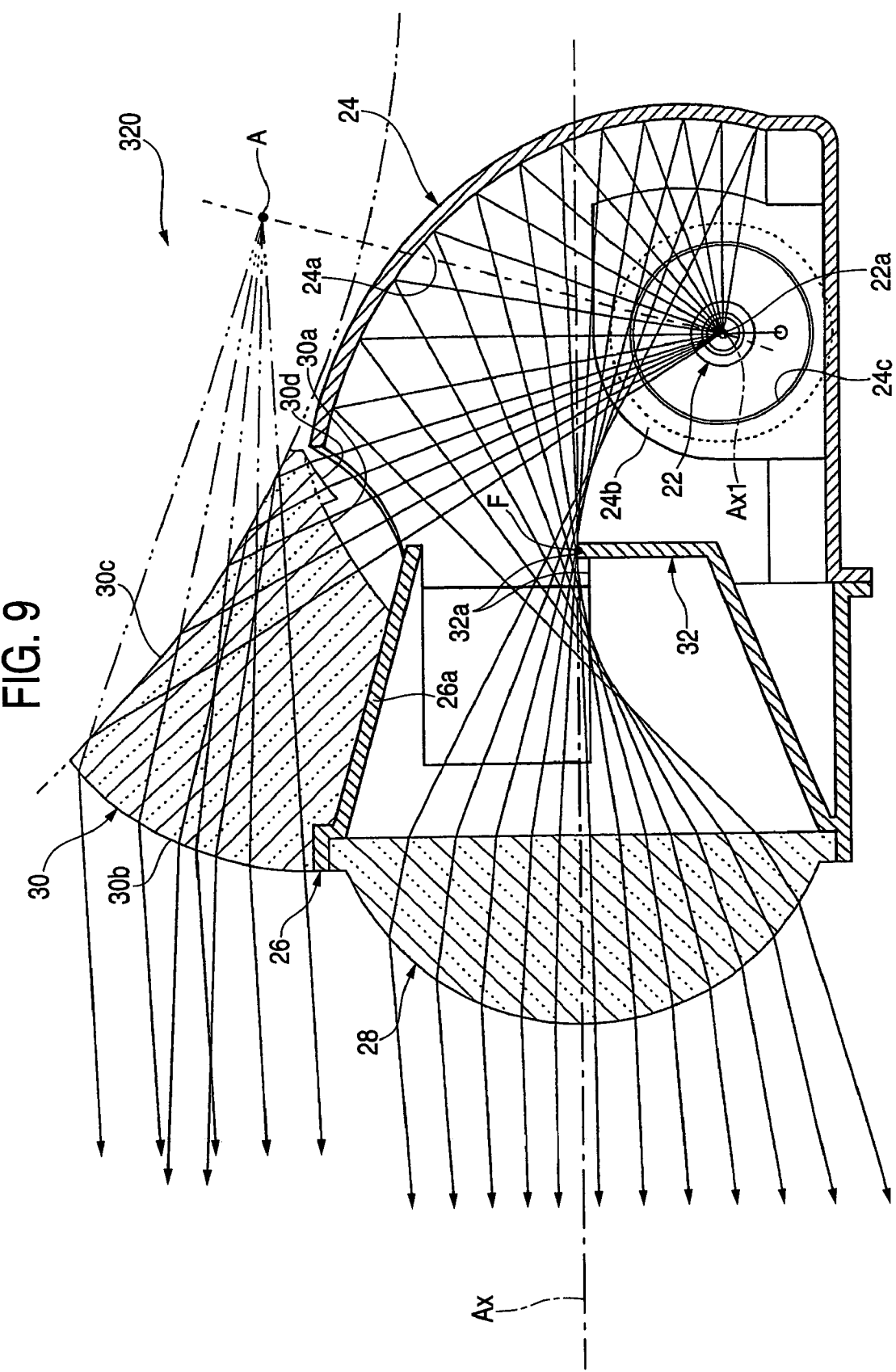
FIG. 9 is a sectional side view showing, as a single unit, a lighting unit in a vehicle headlamp according to a fourth embodiment of the invention.

FIG. 9 is a sectional side view showing, as a single unit, a lighting unit 320 of a vehicle headlamp according to the embodiment.

As shown in FIG. 9, the basic structure of the lighting unit 320 is entirely the same as that in the second embodiment, and the structure of a light transmitting member 30 is partially different from that in the second embodiment.

More specifically, the lighting unit 320 is provided with an upper irradiating lens portion 30d for emitting, to the light transmitting member 30, a direct light from a light source 22a as an upward light from an optical axis Ax. The upper irradiating lens portion 30d is formed by partially protruding an incidence plane 30a of the light transmitting member 30 like a wedge. The upper irradiating lens portion 30d serves to partially lessen the light deflecting function of the light transmitting member 30 and to cause a part of a light emitted from an emitting plane 30b to be turned slightly upward.

Figure 10:
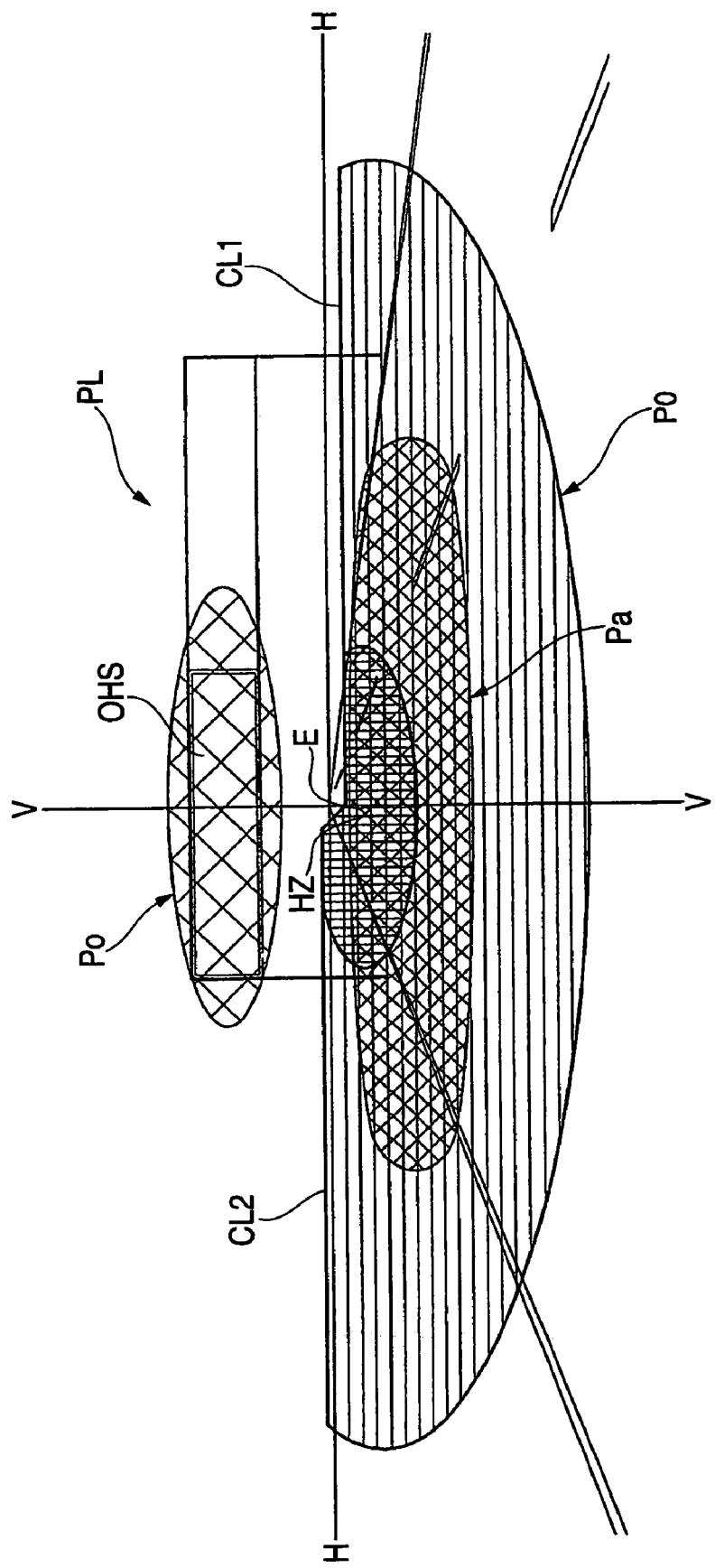
FIG. 10 is a perspective view showing a light distribution pattern formed on a virtual vertical screen by a light irradiated forward from the lighting unit illustrated in FIG. 9.

FIG. 10 is a perspective view showing a light distribution pattern PL for a low beam which is formed on the virtual vertical screen by a light irradiated forward from the lighting unit 320.

As shown in FIG. 10, in the light distribution pattern PL for a low beam, a basic light distribution pattern P0 is the same as that of the second embodiment and an additional light distribution pattern Pa has a part formed as a light distribution pattern Po for an overhead sign irradiation. The light distribution pattern Po for an overhead sign irradiation is formed to irradiate an overhead sign OHS in the forward part of a vehicle running road, thereby maintaining a visibility.

By employing the structure according to the embodiment, thus, it is possible to obtain almost the same functions and advantages as those in the second embodiment, and furthermore, to maintain the visibility of the overhead sign OHS by the formation of the light distribution pattern Po for an overhead sign irradiation.

In addition, the upper irradiating lens portion 30d is formed by partially protruding the incidence plane 30a of the light transmitting member 30 like a wedge. Therefore, it is possible to form the light distribution pattern Po for an overhead sign irradiation without damaging the appearance of the light transmitting member 30.

Next, description will be given to a fifth embodiment of the invention.

Figure 11:
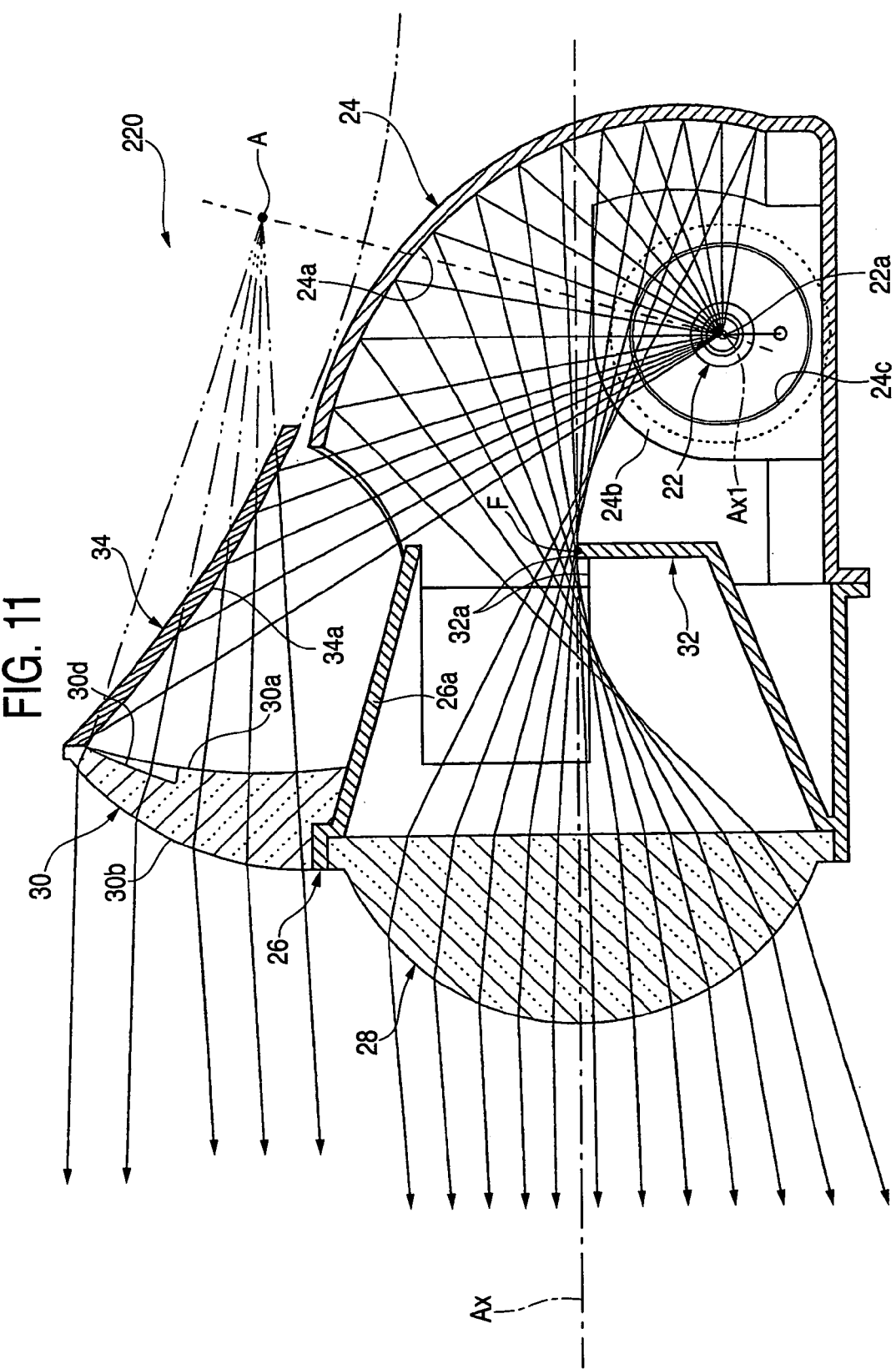
FIG. 11 is a sectional side view showing, as a single unit, a lighting unit in a vehicle headlamp according to a fifth embodiment of the invention.

FIG. 11 is a sectional side view showing, as a single unit, a lighting unit 420 of a vehicle headlamp according to the embodiment.

As shown in FIG. 11, the basic structure of the lighting unit 420 is entirely the same as that in the third embodiment, and the structure of a light transmitting member 30 is partially different from that in the third embodiment.

More specifically, the lighting unit 420 is provided with an upper irradiating lens portion 30d for emitting, to the light transmitting member 30, a direct light from a light source 22a as an upward light from an optical axis Ax. The upper irradiating lens portion 30d is formed by partially cutting away an incidence plane 30a of the light transmitting member 30. The upper irradiating lens portion 30d serves to partially lessen the light deflecting function of the light transmitting member 30 and to cause a part of a light emitted from an emitting plane 30b to be turned slightly upward.

By employing the structure according to the embodiment, thus, it is possible to maintain the visibility of an overhead sign OHS by the formation of the light distribution pattern Po for an overhead sign irradiation shown in FIG. 10 in the same manner as in the fourth embodiment.

In addition, the upper irradiating lens portion 30d is formed by partially cutting away the incidence plane 30a of the light transmitting member 30 like a wedge. Therefore, it is possible to form the light distribution pattern Po for an overhead sign irradiation without damaging the appearance of the light transmitting member 30.

While the description has been given on the assumption that the vertical sectional shape of the incidence plane 30a of the light transmitting member 30 is set to be the shape of a circular arc with the light source 22a to be a center, the vertical sectional shape of the internal reflecting plane 30c is set to be a hyperbolic shape in which the predetermined point A acts as a conjugate focal point with the light source 22a, and the vertical sectional shape of the emitting plane 30b is set to be an elliptical shape with the predetermined point A to be a focal point in the second embodiment, it is possible to obtain almost the same functions and advantages as those in the second embodiment also in the case in which each of the vertical sectional shapes is set to be a curved shape approximating to the shape of the circular arc, the hyperbolic shape or the elliptical shape.

While the description has been given on the assumption that the vertical sectional shape of the reflecting plane 34a of the additional reflector 34 is set to be a hyperbolic shape in which the predetermined point A acts as a conjugate focal point with the light source 22a, the vertical sectional shape of the incidence plane 30a of the light transmitting member 30 is set to be the shape of a circular arc with the predetermined point A to be a center, and the vertical sectional shape of the emitting plane 30b is set to be an elliptical shape with the predetermined point A to be a focal point in the third embodiment, it is possible to obtain almost the same functions and advantages as those in the third embodiment also in the case in which each of the vertical sectional shapes is set to be a curved shape approximating to the hyperbolic shape, the shape of the circular arc or the elliptical shape.

While the description has been given on the assumption that the holder 26 is provided between the projection lens 28 and the light transmitting member 30 in each of the embodiments, it is also possible to employ a structure in which the projection lens 28 and the light transmitting member 30 are directly fixed to each other.

While the description has been given on the assumption that the lighting units 20, 120, 220, 320 and 420 are functioning as irradiating a light for forming the light distribution pattern PL for a low beam in each of the embodiments, moreover, the additional light distribution pattern Pa shown in each of the embodiments can be formed with a structure in which the light transmitting member 30 is provided or the light transmitting member 30 and the additional reflector 34 are provided as in each of the embodiments also in case of a lighting unit for forming a light distribution pattern for a high beam. Consequently, it is possible to increase the brightness of the light distribution pattern for a high beam.

While the description has been given on the assumption that the light source valve 22 is inserted into the reflector 24 from just a side in each of the embodiments, it is possible to obtain almost the same functions and advantages as those in each of the embodiments if an insertion angle is slightly shifted just sideward and a shift in a vertical or longitudinal direction is equal to or smaller than approximately 30 degrees.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:
   a projection lens provided on an optical axis extended in a longitudinal direction of the vehicle;
   a light source provided rear of a focal point on a rear side of the projection lens;
   a reflector which reflects light forwardly from the light source toward the optical axis,
   the light source comprises a light emitting portion of a light bulb which is inserted and fixed into the reflector from a side of the optical axis in a position placed downward from the optical axis, and
   a light transmitting member disposed between the projection lens and the reflector, where a direct light emitted from the light source directly toward an upper space of the projection lens is deflected by the light transmitting member and irradiated downwardly in the vicinity of an upper end of an outer peripheral edge portion of the projection lens,
   wherein a part of light, which is emitted from the light bulb and reflected at an optical-axis side region of a reflecting plane of the reflector, is irradiated through the projection lens,
   and said optical axis side region comprises a side part region of the reflector that is intersected with an imaginary horizontal plane which includes the optical axis, and the position where said light bulb is inserted and fixed into the reflector is provided beneath said side part region,
   wherein an additional reflector for reflecting the direct light from the light source toward an incidence plane of the light transmitting member is provided on a rear side of the light transmitting member,
   a vertical sectional shape of a reflecting plane of the additional reflector is set to be a hyperbolic shape in which a predetermined point positioned above the optical axis acts as a conjugate focal point with the light source, and
   a vertical sectional shape of the incidence plane of the light transmitting member is set to be a shape of a circular arc with the predetermined point to be a center and a vertical sectional shape of an emitting plane of the light transmitting member is set to be an elliptical shave with the predetermined point to be a focal point.

2. The vehicle headlamp according to claim 1, wherein the light transmitting member is provided along the outer peripheral edge portion of the projection lens.

3. The vehicle headlamp according to claim 1, wherein a surface shape of an emitting plane of the light transmitting member is set to be a convex curved shape.

4. A vehicle headlamp comprising:
   a projection lens provided on an optical axis extended in a longitudinal direction of the vehicle;
   a light source provided rear of a focal point on a rear side of the projection lens;
   a reflector which reflects light forwardly from the light source toward the optical axis,
   the light source comprises a light emitting portion of a light bulb which is inserted and fixed into the reflector from a side of the optical axis in a position placed downward from the optical axis, and
   a light transmitting member disposed between the projection lens and the reflector, where a direct light emitted from the light source directly toward an upper space of the projection lens is deflected by the light transmitting member and irradiated downwardly in the vicinity of an upper end of an outer peripheral edge portion of the projection lens,
   wherein a part of light, which is emitted from the light bulb and reflected at an optical-axis side region of a reflecting plane of the reflector, is irradiated through the projection lens,
   and said optical axis side region comprises a side part region of the reflector that is intersected with an imaginary horizontal plane which includes the optical axis, and the position where said light bulb is inserted and fixed into the reflector is provided beneath said side part region;
   wherein the light transmitting member includes an internal reflecting plane for internally reflecting the direct light emitted from the light source and incident on the light transmitting member toward an emitting plane of the light transmitting member;
   wherein a vertical sectional shape of an incidence plane of the light transmitting member is set to be a shape of a circular arc with the light source to be a center; and
   wherein a vertical sectional shape of the internal reflecting plane of the light transmitting member is set to be a hyperbolic shape in which a predetermined point positioned above the optical axis acts as a conjugate focal point with the light source and a vertical sectional shape of the emitting plane of the light transmitting member is set to be an elliptical shape having the predetermined point to be a focal point.

5. The vehicle headlamp according to claim 1, wherein a shade for shielding a part of a light reflected from the reflector is provided in the vicinity of the focal point on the rear side in such a manner that an upper edge of the shade is positioned in the vicinity of the optical axis.

6. The vehicle headlamp according to claim 5, wherein the light transmitting member is provided with an upper irradiating lens portion for emitting the direct light from the light source as an upward light from the optical axis.

7. A vehicle headlamp according to claim 1, wherein the light transmitting member is in the shape of a prism.

8. The vehicle headlamp according to claim 1, wherein the light source is inserted in the head lamp in a direction perpendicular to the optical axis.

9. The vehicle headlamp according to claim 1, wherein the light transmitting member has an inner cylindrical portion which extends from an outer portion of the projection lens inwardly towards the optical axis.

10. The vehicle headlamp according to claim 1, wherein a portion of the light emitted from the light source is directly reflected to the light transmitting member and another portion of the light is reflected by the reflector directly to the projection lens.

11. The vehicle headlamp according to claim 9, wherein light does not pass through the inner cylindrical portion.

12. The vehicle headlamp according to claim 1, wherein the light transmitting member is attached to an upper portion of the projection lens.

13. The vehicle headlamp according to claim 1, wherein the light transmitting member has a front surface which is curved outwardly.

14. The vehicle headlamp according to claim 9, further comprising a shade positioned below the optical axis, wherein the shade blocks a portion of light emitted from the light source and is integral with the inner cylindrical portion.

15. The vehicle headlamp according to claim 14, wherein the shade is attached to a bottom of the projection lens.

16. The vehicle headlamp according to claim 1, wherein the light bulb is entirely beneath the optical axis.

* * * * *